US006776298B2

(12) United States Patent
Courtwright

(10) Patent No.: US 6,776,298 B2
(45) Date of Patent: Aug. 17, 2004

(54) FRONT BEAM AND TENSION ROD ARRANGEMENT FOR PUSH BACK RACK STORAGE SYSTEM

(75) Inventor: James A. Courtwright, North East, PA (US)

(73) Assignee: Ridg-U-Rak, Inc., North East, PA (US)

( * ) Notice: Subject to any disclaimer, the term of this patent is extended or adjusted under 35 U.S.C. 154(b) by 0 days.

(21) Appl. No.: 10/106,278

(22) Filed: Mar. 26, 2002

(65) Prior Publication Data

US 2002/0139766 A1 Oct. 3, 2002

Related U.S. Application Data

(60) Provisional application No. 60/281,219, filed on Apr. 3, 2001.

(51) Int. Cl.[7] ............................................. A47B 47/00
(52) U.S. Cl. ..................................... 211/191; 211/183
(58) Field of Search ................................ 211/190, 191, 211/192, 151, 134, 183, 189, 182; 414/276, 286; 403/286, 299, 300–302, 79

(56) References Cited

U.S. PATENT DOCUMENTS

| | | | | |
|---|---|---|---|---|
| 3,009,582 A | * | 11/1961 | Degener | 211/191 |
| 3,827,377 A | * | 8/1974 | Aughtry, Jr. | 108/108 |
| 3,963,290 A | * | 6/1976 | Rennemann | 312/321 |
| 4,136,785 A | * | 1/1979 | McDevitt | 211/190 |
| 4,262,809 A | * | 4/1981 | McConnell | 211/192 |
| 4,712,286 A | * | 12/1987 | Wolf | 29/463 |
| 4,972,783 A | * | 11/1990 | Crissman et al. | 108/107 |
| 5,312,004 A | * | 5/1994 | Krummell et al. | 211/151 |
| 5,573,125 A | * | 11/1996 | Denny | 211/183 |
| 6,053,466 A | * | 4/2000 | Jordan et al. | 248/346.01 |
| 6,129,224 A | * | 10/2000 | Mingers | 211/193 |
| 6,161,981 A | * | 12/2000 | Dehlin | 403/43 |
| 6,216,893 B1 | * | 4/2001 | Lee | 211/189 |
| 6,223,913 B1 | * | 5/2001 | Mosher | 211/85.8 |
| 2003/0010739 A1 | * | 1/2003 | Konstant | 211/189 |

* cited by examiner

Primary Examiner—Jennifer E. Novosad
(74) Attorney, Agent, or Firm—Edward W. Goebel, Jr.; Jon L. Woodard; MacDonald Illig Jones & Britton LLP

(57) ABSTRACT

A beam and tension rod arrangement is for use with a push back storage rack system. A front beam extends between two front vertical uprights across the loading position of one or more cart lanes. An interior structural cross support extends between two interior vertical uprights that are located at points along the length of each cart lane. Diagonal tension rods extend from each end of the interior structural cross support to points on the front beam's structural angles brackets that are adjacent the middle portion of the front beam. When a loaded cart collides with the front beam, the majority of the collision forces are directed toward the middle portion of the front beam, which exerts diagonal tension forces on the tension rods between the front beam and the interior structural cross support. The diagonal tension rods serve to brace the front beam against flexing, transferring much of the impact strain to the interior structural cross support. The tension rods distribute the impact forces exerted against the front beam among the system's multiple interior vertical uprights to reinforce the front beam.

12 Claims, 7 Drawing Sheets

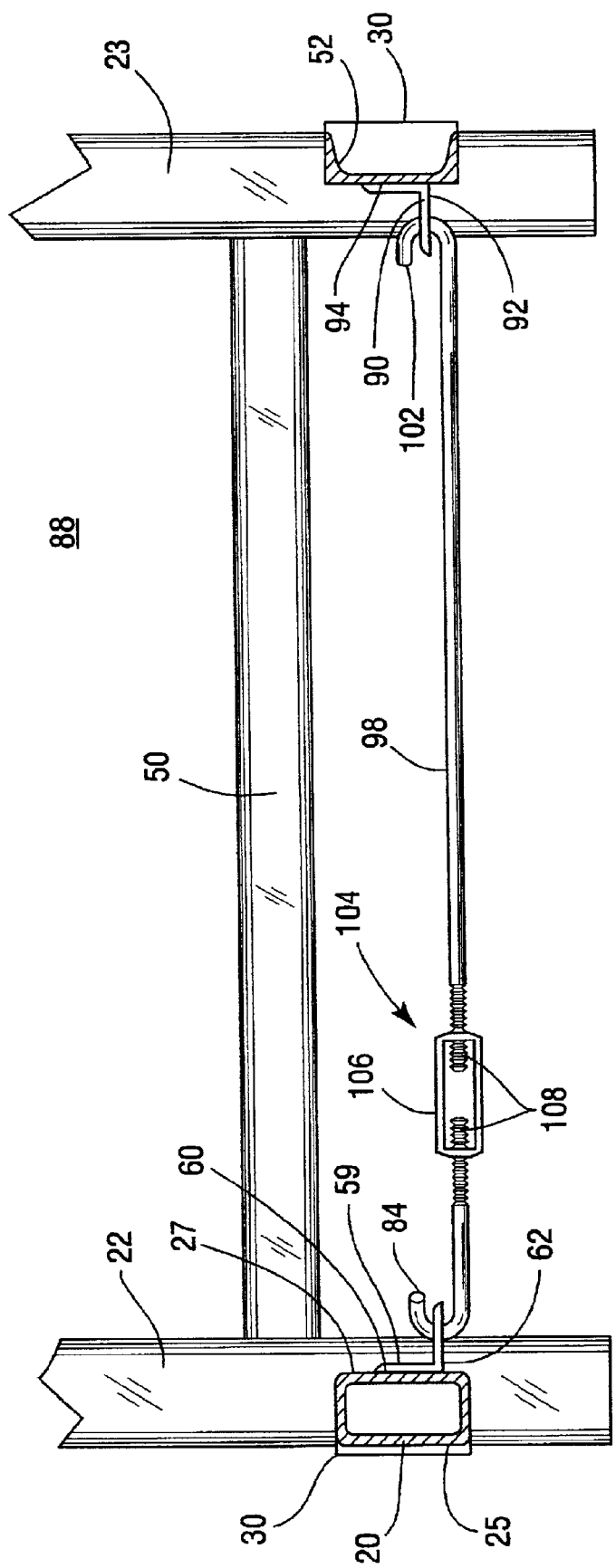

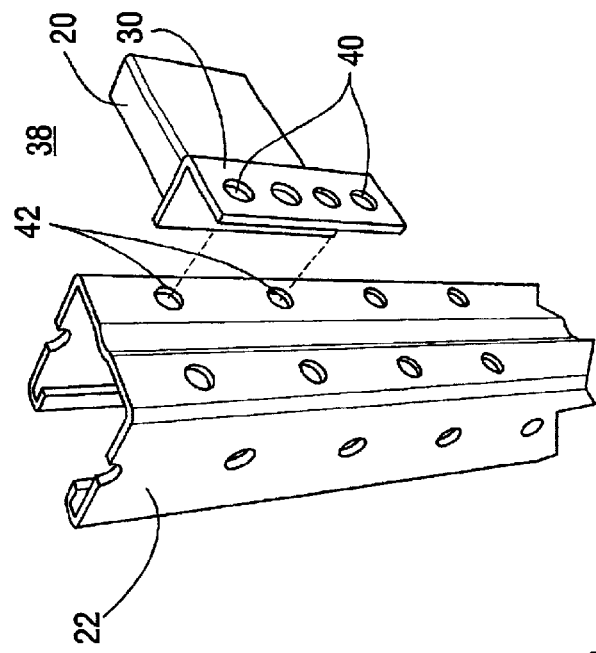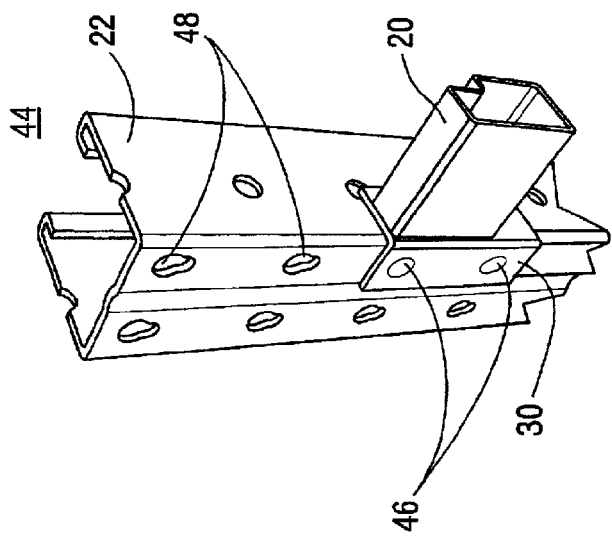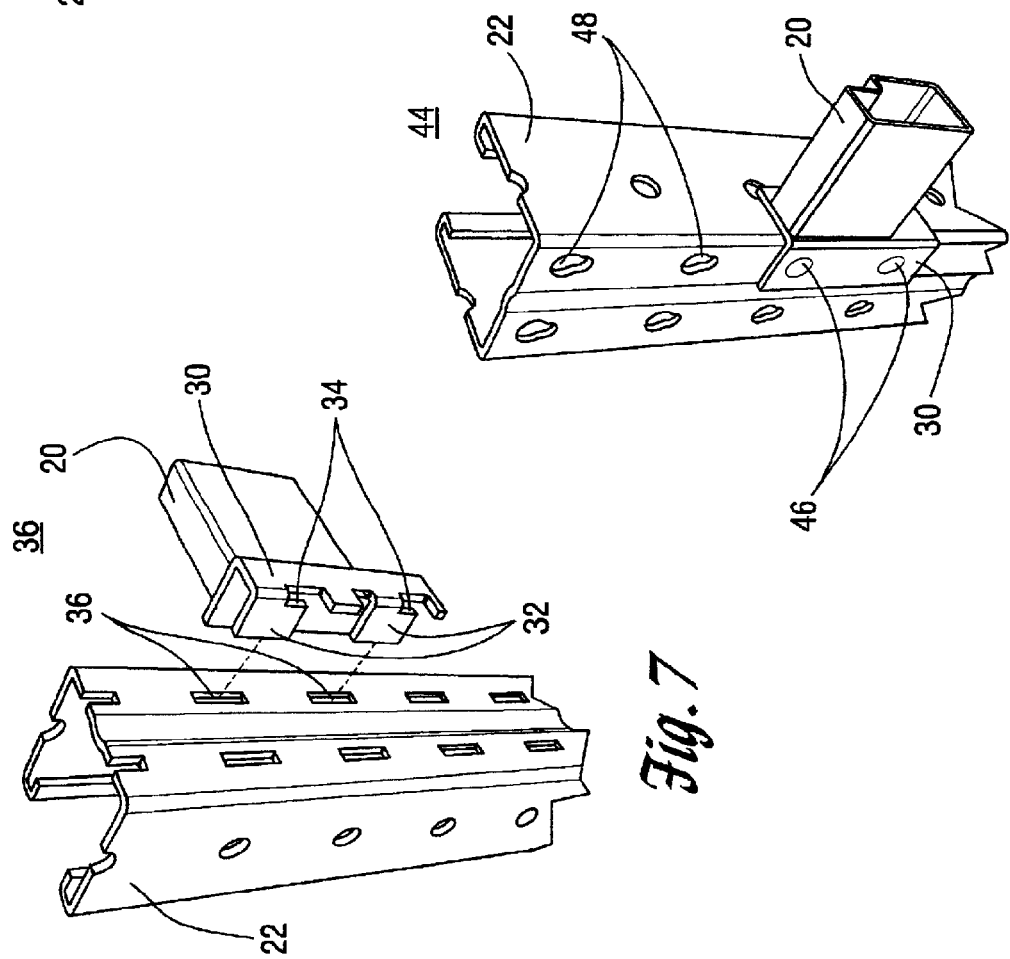

FRONT BEAM AND TENSION ROD ARRANGEMENT FOR PUSH BACK RACK STORAGE SYSTEM

This application claims the benefit of U.S. Provisional Application No. 60/281,219 filed on Apr. 3, 2001, which is incorporated herein by reference.

BACKGROUND

The present invention is directed to a front beam and tension rod arrangement for use with a push back storage rack system.

Push back storage rack systems normally comprise an assembly of shelves and interconnected front and interior vertical uprights for storing loads placed on tracks or other base members in one or more storage lanes. Each storage lane has one loading position capable of storing one load. One or more push back carts are positioned in the loading position. Each cart is capable of receiving one load and is positioned to be pushed toward the back of the lane by the next load. Such systems normally have their tracks in each lane tilted toward the loading position so that the force of gravity causes the next cart in line to return to the loading position when a load occupying the loading position is removed.

Most push back storage rack systems have a transversely positioned front beam placed in front of each lane's loading position to provide structural support between the two most adjacent vertical uprights. The vertical positioning of each front beam is usually sufficiently low to allow for the addition of loads to each lane's loading position. Due to this positioning, the front beams of most designs also serve to restrict downward cart movement once a cart enters the loading position. In most circumstances, a cart moving into the loading position from a higher track position bears substantial additional weight from its load. As a consequence, a front beam must withstand the combined sliding impact of both a cart and its load when the cart collides with the beam at the loading position.

During the operational life of most storage rack systems, each beam must withstand repeated collisions from loaded carts. The collisions tend to cause the front beam to flex outward, gradually warping the beam over time into an outward bowed shape. This warping can be unsightly, can lead to slight dimensional changes in the system's rack structure, and can reduce the overall functionality of a push back rack system.

Previous rack systems have attempted to reduce this bowing effect by providing for multiple attachments between cart tracks and interior structural members. In such designs, the ends of each track are then bolted or welded to the beam so that the interior structural members assist the tracks in bracing against cart collisions. Such designs require the addition of at least one angle assembly at each separate interconnection point between the tracks and interior structural members, significantly increasing the system's cost. When a cart collides with a beam, the combined angle assemblies disperse compression load forces at right angles from the tracks to vertical support members, significantly reducing the system's overall ability to support the beam and to prevent warping.

Other systems have included the incorporation of clamping plates for providing connections between the rails and beams. These systems have suffered from many of the same limitations as simple bolted or welded designs due to compression forces associated with angular bracing and due to the structural limitations of the beams. In a number of designs, heavier beams or more rigid beam materials have been used to compensate for such limitations in the implemented bracing systems. While these designs have been successful in delaying or reducing the effects of warping, they too ultimately permit warping to occur after extended periods of usage.

SUMMARY

The present invention is a beam and tension rod arrangement for use with a push back storage rack system. In a push back rack system, a front beam extends between two front vertical uprights across the loading position of one or more cart lanes. The front beam is divided into a middle portion and first and second ends and may also have a rectangular cross section for increased rigidity. The front beam may also have a vertically planar back surface positioned toward the cart lane and a vertically planar front surface positioned away from the cart lane.

One or more structural angles brackets may be positioned on the front beam's back surface near the beam's middle portion and extend partially along the length of the front beam toward the beam's first and second ends. An interior structural cross support extends between two interior vertical uprights that are located at points along the length of each cart lane. The interior structural cross support has first and second ends which connect to the adjacent interior vertical uprights. Diagonal tension rods extend from each end of the interior structural cross support to points on the front beam's structural angles brackets that are adjacent to the beam's middle portion.

In some embodiments of the invention, the tension rods have hooked ends which extend through holes in the beam's structural angles brackets. The tension rods may also have threaded ends which extend through the interior structural cross support and which permit variable tightening of the tension rods between the beam and structural cross support with a nut and washer combination.

When a loaded cart enters the loading position of the cart lane, the cart collides with the front beam. The majority of the collision forces are directed toward the middle portion of the front beam, which tends to flex under the strain of the collision. However, the front beam exerts diagonal tension forces on the tension rods between the beam and the interior structural cross support. The diagonal tension rods serve to brace the front beam against such flexing, transferring much of the impact strain to the interior structural cross support. In doing so, the tension rods tend to more evenly distribute the impact forces among the system's multiple interior vertical uprights. The arrangement distributes impact forces relying largely on linear tension rather than on angular compression, making the invention better suited to brace the front beam during collisions. Some embodiments have a front beam with rectangular cross sections which provide additional resistance to the impact force due to the increased structural rigidity resulting from their shape. Both separately and in combination, the elements of the beam and tension rod arrangement provide heightened resistance to beam warping even after extended use.

Those skilled in the art will realize that this invention is capable of embodiments which are different from those shown and described below and that the details of the structure of this beam and tension rod arrangement can be changed in various manners without departing from the scope of this invention. Accordingly, the drawings and description below are to be regarded as illustrative in nature and are not to restrict the scope of this invention. The claims are to be regarded as including such equivalent front beam and tension rod arrangements as do not depart from the spirit and scope of the invention.

BRIEF DESCRIPTION OF THE DRAWINGS

For a more complete understanding and appreciation of this invention and many of its advantages, reference should be made to the following Detailed Description of the Preferred Embodiments taken in conjunction with the accompanying drawings wherein:

FIG. 6 is a side view of the front beam and tension rod arrangement of FIG. 5, including a turnbuckle tightener according to one embodiment of the invention;

FIG. 7 is an exploded perspective view of a hook and slot endplate connection between a front beam end and a front vertical upright according to one embodiment of the invention;

FIG. 8 is a perspective view of a bolt endplate connection between a front beam end and a front vertical upright according to one embodiment of the invention; and FIG. 9 is an exploded perspective view of a tear-drop endplate connection between a front beam end and a front vertical upright according to one embodiment of the invention.

DETAILED DESCRIPTION OF THE PREFERRED EMBODIMENTS

Figure 1:
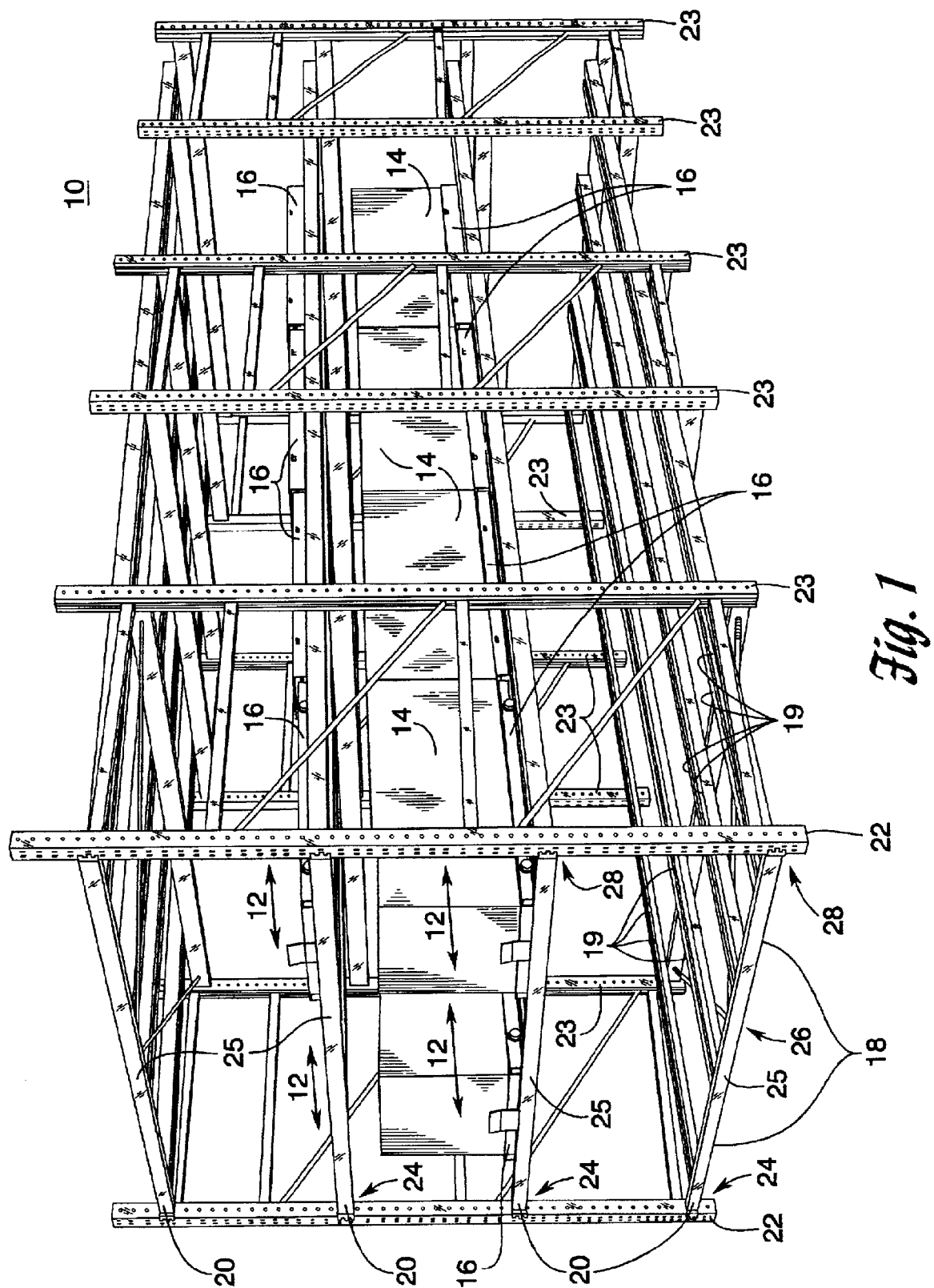
FIG. 1 depicts a typical, multiple lane push back storage rack system incorporating front beam and tension rod arrangements according to the invention.

Referring to the drawings, identical reference numerals designate the same or corresponding parts throughout the several figures shown in the drawings.

FIG. 1 depicts a push back storage rack system 10 having multiple cart lanes 12 for accommodating loads 14 on sliding push back carts 16 along the length of each cart lane 12. Each cart lane 12 has a loading end 18 where loads 14 are placed on carts 16 which slide along rails 19. Front beams 20 extend between adjacent vertical uprights 22 at each loading end 18 and provide structural support along the width of the storage rack system 10. A single front beam 20 typically extends across the loading ends 18 of two adjacent cart lanes 12.

Figure 2:
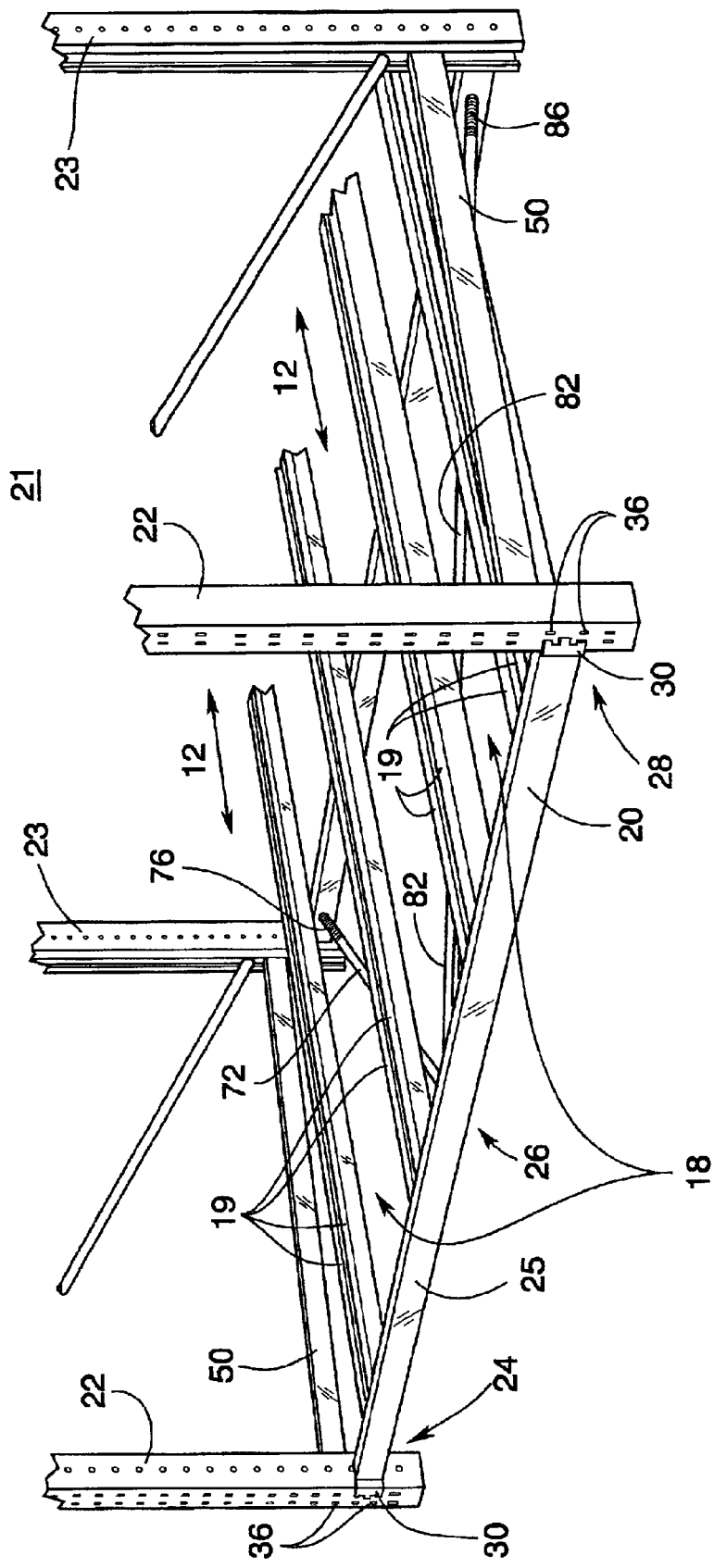
FIG. 2 is a perspective view of two lanes of a push back storage rack system including a front beam and tension rod arrangement according to the invention.
Figure 4:
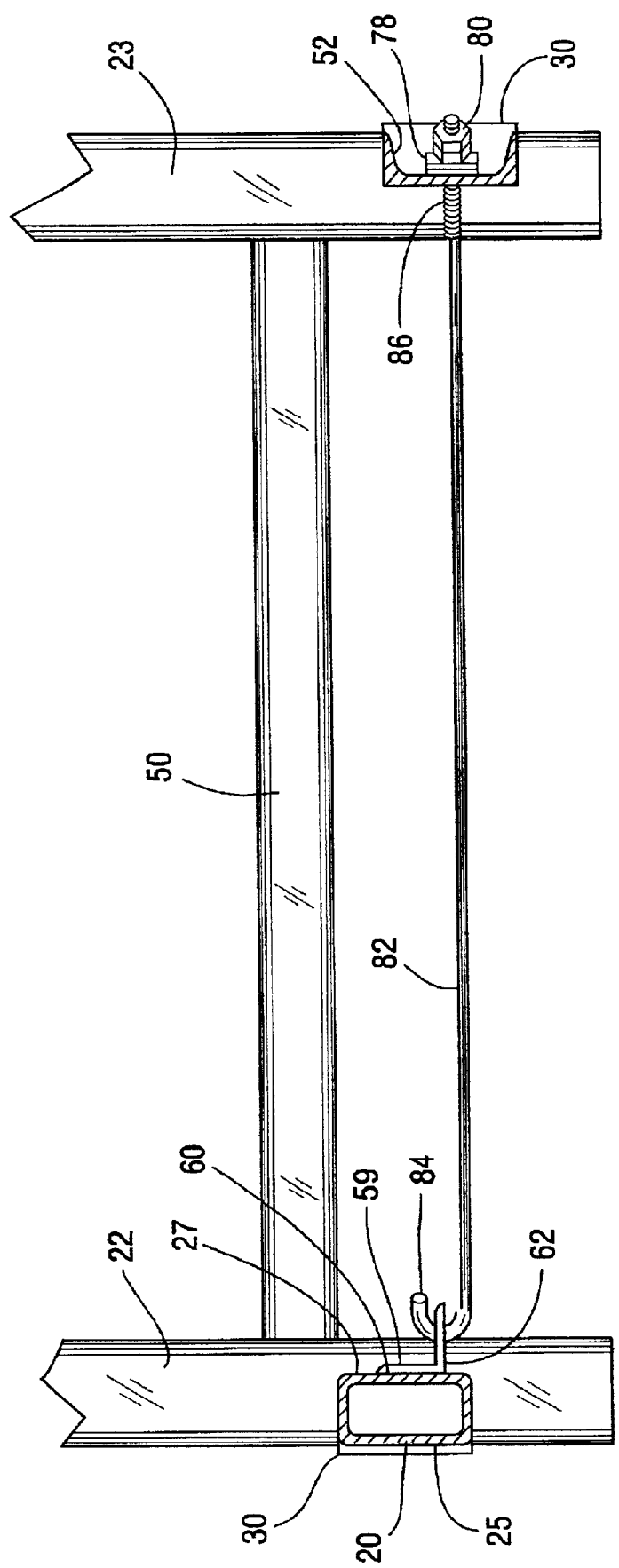
FIG. 4 is a side view of the front beam and tension rod arrangement of FIG. 3.

A closer perspective view of a front beam and tension rod arrangement 21 including a front beam 20 extending across two adjacent lanes 12 is depicted in FIG. 2. As best understood with a brief comparison of FIG. 2 and FIG. 4, the front beam 20 has a substantially rectangular cross sectional shape. This cross sectional configuration tends to increase the structural rigidity of the beam 20, making the beam 20 better suited to resist the impact of colliding carts 16 and less prone to outward warping. The front beam 20 includes a first end 24, a middle portion 26, a second end 28, and extends between two front vertical uprights 22 adjacent the loading ends 18 of each cart lane 12. The front beam 20 also has a vertically planar front surface 25 positioned away from each cart lane 12 and a vertically planar back surface 27 positioned toward each cart lane 12. Endplate connectors 30 are welded to the first and second ends 24 and 28 of the front beam 20 to connect the beam 20 to the front vertical uprights 22.

Referring to FIG. 7, a closer and exploded perspective view of this connection is depicted. In a hook-and-slot style of connection 36, each endplate connector 30 includes a plurality of lugs 32, each lug 32 having a locking undercut 34. Adjacent front vertical uprights 22 have slots 36 that permit insertion and downward sliding of the lugs 32 so that the locking undercuts 34 engage the inside surfaces of the slots 36 to vertically support the front beam 20 on the vertical uprights 22.

Although FIGS. 1 and 2 depict an arrangement having a hook-and-slot type of connection 36 between the front beam 20 and front vertical upright 22, it will be appreciated that other types of connections are also possible and are contemplated to be within the scope of the invention. FIG. 8 is an exploded view of an alternate embodiment bolt connection 38 including an endplate connector 30 having a plurality of connection holes 40. The front vertical upright 22 has circular slots 42 spaced along the height of the vertical upright 22. The connection holes 40 are positioned on the endplate connector 30 to line up with the circular slots 42 of the front vertical upright 22 to permit the insertion of a machine bolt or other hardware (not shown) for fastening the beam 20 to the vertical upright 22. FIG. 9 shows an additional embodiment tear drop connection 44 including an endplate connector 30 having a plurality of studs 46 extending inward to engage the front vertical upright 22. In this connection 44, the front vertical upright 22 includes a plurality of tear drop shaped slots 48 for inserting the studs 46 of the endplate connector 30 into the vertical upright 22 and for locking the studs 46 in place by sliding the endplate connector 30 downward.

Figure 3:
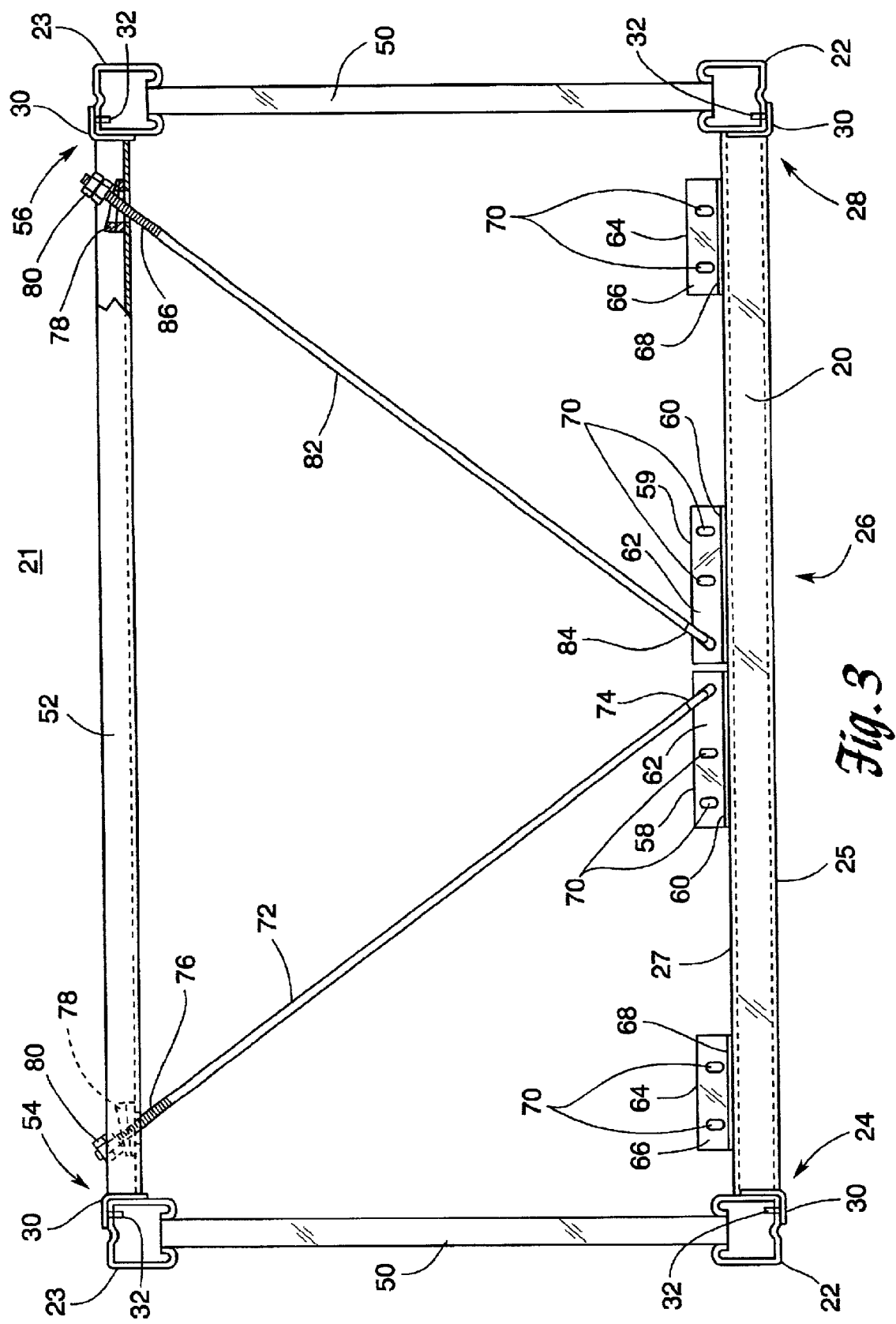
FIG. 3 is a top view of a front beam and tension rod arrangement according to one embodiment of the invention.

Referring once again to FIG. 2, side braces 50 connect the front vertical uprights 22 to interior vertical uprights 23, located along the length of each cart lane 12. An interior structural cross support 52 extends between two of the interior vertical uprights 23 to provide horizontal interior support along the width of the storage rack system 10. FIG. 3 shows a top view of the front beam and tension rod arrangement 21 including the interior structural cross support 52 extending between two of the interior vertical uprights 23. The interior structural cross support 52 has a first end 54 and a second end 56 to which endplates 30, similar to those positioned at the first end 24 and second end 28 of the front beam 20, are welded. The endplates 30 secure the first end 54 and second end 56 of the interior cross support 52 to the interior vertical uprights 23. Although the invention is shown as having an endplate connection of the hook and slot type 36 in FIGS. 1, 2, 3, and 7, it will be appreciated that other endplate connection types, such as but not limited to the bolt endplate connection 38 of FIG. 8 and tear-drop endplate connection 44 of FIG. 9, may also be used to secure the interior structural cross support 52 to interior vertical uprights 23 without departing from the invention.

FIG. 2 shows the front beam 20 and interior structural cross support 52 extending across the width of two adjacent lanes 12. Each cart 16 (not shown in FIG. 2) slides on rails 19 which extend the length of each cart lane 12. As best seen with reference to FIG. 3 and FIG. 4, the front beam 20 includes a first center structural angle bracket 58 and a second center structural angle bracket 59, each positioned adjacent the center of the front beam 20. The first and second center structural angles brackets 58 and 59 each have a vertically planar attachment surface 60 that is welded to the vertically planar back surface 27 of the beam 20 and a horizontally planar hooking surface 62 extending inward toward the cart lanes 12. Side structural angles brackets 64 are positioned on the front beam 20 near the first and second ends 24 and 28. Each side structural angle bracket 64 has a separate vertically planar attachment surface 68 and horizontally planar hooking surface 66. Rail anchoring holes 70 extend through the horizontally planar hooking surfaces 62 of the first and second center structural angles brackets 58 and 59 and through the horizontally planar hooking surfaces 66 of each side structural angle bracket 64. As best seen in FIG. 2, the rail anchoring holes 70 allow for positioning of the rails 19 against the front beam 20.

FIG. 3 depicts a diagonal first tension rod 72 and a diagonal second tension rod 82. The first tension rod 72 extends between the first end 54 of the interior structural cross support 52 to the first center structural angle bracket 58. The second tension rod 82 extends between the second end 56 of the interior structural cross support 52 and the second center structural angle bracket 59. The first tension rod 72 includes a hooked first end 74 which extends through the horizontally planar hooking surface 62 of the first structural angle bracket 58 near the middle portion 26 of the front beam 20. The second tension rod 82 includes a hooked first end 84 which extends through the horizontally planar hooking surface 62 of the second structural angle bracket 59 near the middle portion 26 of the front beam 20. The hooked first ends 74 and 84 of the tension rods 72 and 82 both extend upward through the structural angles brackets 58 and 59 to allow for additional clearance between the tension rods 72 and 82 and the rails 19.

Each tension rod 72 and 82 includes a threaded second end 76 and 86. The second end 76 of the first tension rod 72 extends through the first end 54 of the interior structural cross support 52. The second end 86 of the second tension rod 82 extends through the second end 56 of the interior structural cross support 52. Beveled washers 78 and nuts 80 secure the threaded second ends 76 and 86 of the tension rods 72 and 82 in place. The second ends 76 and 86 of each tension rod 72 and 82 are secured at positions on the interior structural cross support 52 that are adjacent an interior vertical upright 23. Variable tightening of the nuts 80 allows for adjustment of the relative tension between the front beam 20 and interior structural cross support 52.

Consider a cart 16 with a load 14 positioned along the length of a cart lane 12 in a push back storage rack system 10. When the cart 16 returns to the loading end 18 of the cart lane 12, the cart 16 collides into the vertically planar back surface 27 of the front beam 20, the front beam 20 restricting further movement of the cart 16 along the cart lane 12. The majority of the collision forces between the front beam 20 and cart 16 are directed toward the middle portion 26 of the beam 20. In response, the front beam 20 tends to flex under the impact strain, though the rectangular cross sectional beam shape serves to resist outward flexing. The first and second tension rods 72 and 82 are fixed in position between the center structural angles brackets 58 and 59 and interior vertical uprights 23. Being welded to the center structural angles brackets 58 and 59, the front beam 20, in trying to flex outward, exerts diagonal tension forces against the tension rods 72 and 82 which in turn exert forces against the interior structural cross support 52 and indirectly against the interior vertical uprights 23. Thus, the tension rods 72 and 82 serve to further brace the front beam 20 against outward flexing, transferring the impact strain of the collision to the interior components of the rack system 10.

In transferring collision forces to interior system components, the beam and tension rod arrangement 21 tends to rely more on the transfer of linear tension forces than on angular compression forces in dissipating the shock of the collision. Linear tension forces are transferred between the front beam 20 and interior system components through the tension rods 72 and 82. Since each tension rod 72 and 82 is anchored near an end 54 and 56 of the interior structural cross support 52, and since each end 54 and 56 is proximate an interior vertical upright 23, the forces tend to be dissipated by rigid structural support. In the absence of the tension rods 72 and 82, angular compression forces would tend to be dissipated directly by the unsupported middle portion 26 of the front beam 20, which would be more prone to flex and warp with respect to the ends 24 and 28 of the beam 20, the ends 24 and 28 being supported by front uprights 22. Thus, the improved structural support provided by the tension rods 72 and 82 and the rectangular cross sectional shape of the front beam 20 tends to increase the system's overall resistance against the front beam's outward warping after repeated cart collisions.

Although the tension rods 72 and 82 are shown and described as having a single structural component having a hooked first end 74 and 84 and a threaded second end 76 and 86, it will be appreciated that various other configurations are anticipated for transferring linear tension forces between the middle portion 26 of the front beam 20 and the interior structural cross support 52. For example, FIG. 5 depicts an alternate embodiment front beam and tension rod arrangement 88 having cross support angles brackets 90 welded to the interior structural cross support 52 at positions that are proximate interior vertical uprights 23.

Figure 5:
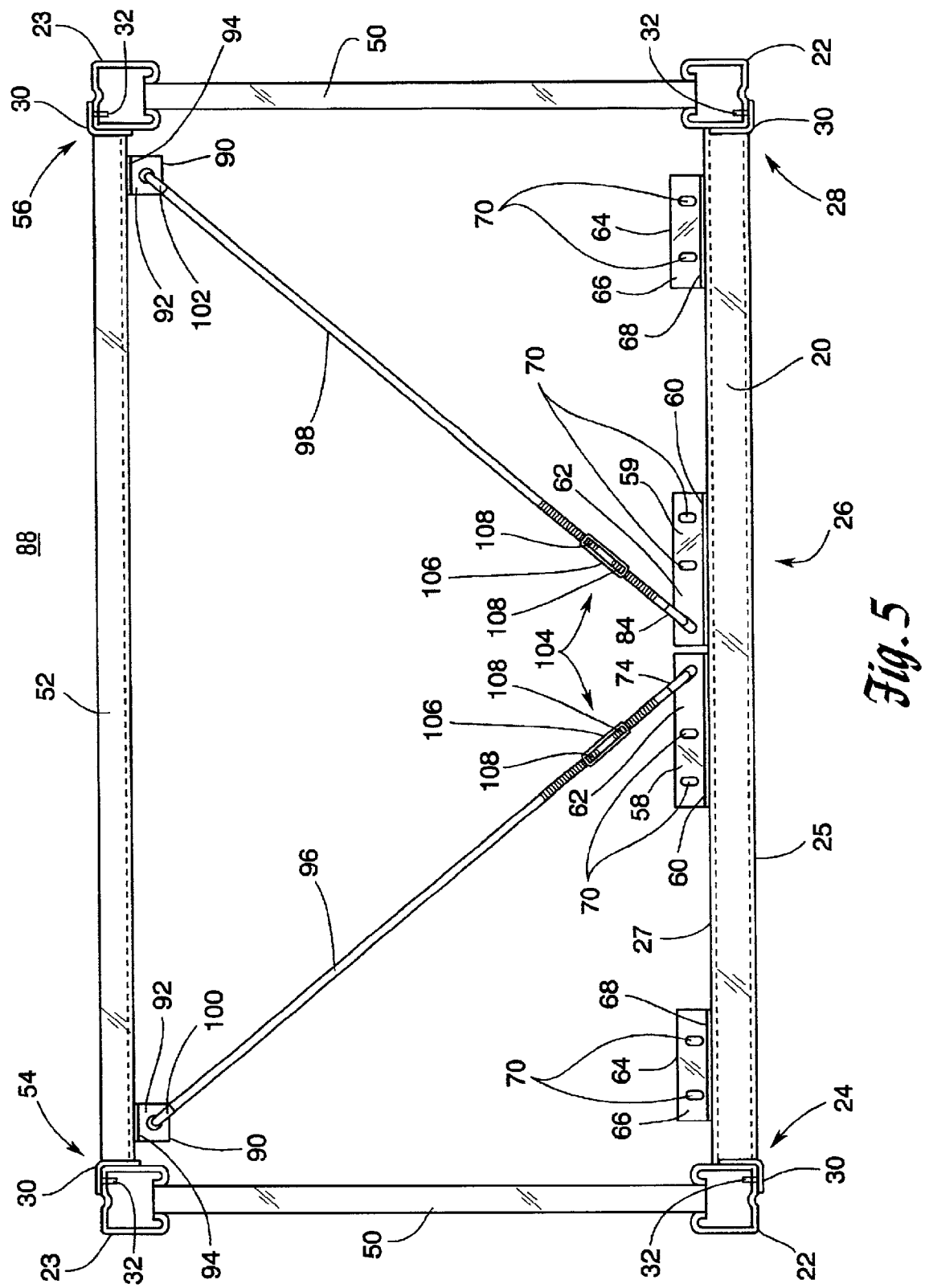
FIG. 5 is a top view of a front beam and tension rod arrangement having a turnbuckle tightener according to one embodiment of the invention.

As best understood by comparing FIG. 5 with the side view of the arrangement in FIG. 6, the cross support angles brackets 90 include horizontally planar surfaces 92 and vertically planar surfaces 94, the vertically planar surfaces 94 being welded to the interior structural cross support 52. The arrangement 88 further includes a diagonal first tension rod 96 and a diagonal second tension rod 98, the tension rods 96 and 98 each having hooked second ends 100 and 102 extending through the horizontally planar surfaces 92 of the cross support angles brackets 90. Each tension rod 96 and 98 includes a turnbuckle adjuster 104 comprising a turnbuckle 106 and two threaded bisection ends 108. The turnbuckle adjusters 104 allow for adjustment of the relative lengths of the tension rods 96 and 98 when the turnbuckles 106 are manually rotated about the axis of each tension rod 96 and 98. Thus, the relative tension between the front beam 20 and interior structural cross support 52 can be varied according to the adjusted tension rod lengths.

Those skilled in the art will recognize that the various features of this invention described above can be used in various combinations with other elements without departing from the scope of the invention. Thus, the appended claims are intended to be interpreted to cover such equivalent beam and tension rod arrangements which do not depart from the spirit and scope of the invention.

What is claimed is:

1. A front beam and tension rod arrangement for a storage rack assembly of a push back storage rack system, the storage rack assembly including a plurality of interconnected front and interior vertical uprights and at least one cart lane, said front beam and tension rod arrangement comprising:

a front beam comprising a structural tube having a middle portion and first and second ends, said front beam extending horizontally between two of the front vertical uprights, said front beam including a vertically planar front surface positioned away from the at least one cart lane and a vertically planar back surface positioned toward the at least one cart lane;

an interior structural cross support having first and second ends, said interior structural cross support extending horizontally between two of the interior vertical uprights;

a diagonal first tension rod extending from said first end of said interior structural cross support to approximately said middle portion of said front beam, said first tension rod being positioned to brace said front beam against outward flexing from impact strain resulting from collision forces that originate from within the rack system;

a diagonal second tension rod extending from said second end of said interior structural cross support to approximately said middle portion of said front beam, said second tension rod being positioned brace said front beam against outward flexing from impact strain resulting from collision forces that originate from within the rack system.

2. The front beam and tension rod arrangement of claim 1, said structural tube of said front beam having a rectangular cross section for increased structural rigidity.

3. A front beam and tension rod arrangement for a storage rack assembly of a push back storage rack system, the storage rack assembly including a plurality of interconnected front and interior vertical uprights and at least one cart lane, said front beam and tension rod arrangement comprising:

a front beam comprising a structural tube having a middle portion and first and second ends, said front beam extending horizontally between two of the interconnected front vertical uprights, said front beam including a vertically planar front surface positioned away from the at least one cart lane and a vertically planar back surface positioned toward the at least one cart lane;

said front beam including at least one structural angle bracket having a vertically planar attachment surface and a horizontally planar hooking surface, said planar attachment surface of said at least one structural angle bracket being attached to said planar back surface of said front beam, said at least one structural angle bracket extending partially along the length of said front beam;

an interior structural cross support having first and second ends, said interior structural cross support extending horizontally between two of said interconnected interior vertical uprights;

a diagonal first tension rod extending from said first and of said interior structural cross support to a point on said horizontally planar hooking surface of said at least one structural angle bracket that is adjacent said middle portion of said front beam, said first tension rod being positioned to prevent the outward warping of said front beam;

a diagonal second tension rod extending from said second end of said interior structural cross support to a point on said horizontally planar hooking surface of said at least one structural angle bracket that is adjacent said middle portion of said front beam, said second tension rod also being positioned to prevent the outward warping of said front beam.

4. The front beam and tension rod arrangement of claim 3, said structural tuba of said front beam having a rectangular cross section for increased structural rigidity.

5. The front beam and tension rod arrangement for the storage rack assembly of a push back storage rack system of claim 3 further comprising:

said first and second tonsion rods each having a hooked first end and a threaded second end, each said hooked first end of said first and second tension rods extending through and being hooked to said at least one structural angle bracket of said front beam, each said threaded second end of said first and second tension rods extending through and being fastened to one of said first and second ends of said interior structural cross support.

6. The front beam and tension rod arrangement for the storage rack assembly of a push back storage rack system of claim 3 wherein said interior structural cross support further comprises cross support angle brackets positioned at said first and second ends of said interior structural cross support, said cross support angle brackets extending toward said front beam;

said first and second tension rods each having a hooked first end and a hooked second end, each said hooked first end of said first and second tension rods extending through and being hooked to said at least one structural angle brackets of said front beam, each said booked second end of said first and second tension rods extending through and being hooked to one of said cross support angle brackets on said interior structural cross support;

a turnbuckle adjuster positioned on each of said first and second tension rods between said hooked first end and said hooked second end, said turnbuckle adjusters being configured to adjust the relative length of said tension rods.

7. The front beam and tension rod arrangement of claim 6, said structural tube of said front beam having a rectangular cross section for increased structural rigidity.

8. A front beam and tension rod arrangement for a storage rack assembly of a push back storage rack system, the storage rack assembly including a plurality of interconnected front and interior vertical uprights and at least one cart lane, said front beam and tension rod arrangement comprising:

a front beam comprising a structural tube having a middle portion, first and second ends, and a rectangular cross sectional shape for increased structural rigidity, said front beam extending horizontally between two of the interconnected front vertical uprights, said front beam including a vertically planar front surface positioned away from the at least on a cart lane and a vertically planar back surface positioned toward the at least one cart lane;

said front beam having a first structural angle bracket and a second structural angle bracket each having a vertically planar attachment surface and a horizontally planar hooking surface, said attachment surfaces of said first and second structural angle brackets being attached to said back surface of said front beam, each of said first and second structural angle brackets extending partially along the length of said front beam;

an interior structural cross support having first and second ends, said interior structural cross support extending horizontally between two of said interconnected interior vertical uprights;

a diagonal first tension rod having a booked first end and a threaded second end, said hooked first end of said first tension rod extending through and being hooked to said hooking surface of said first structural angle bracket at a point that is adjacent said middle portion of said front beam, said threaded second end of said first tension rod extending through and being fastened to said first end of said interior structural cross support, said first tension rod being positioned to prevent the outward warping of said front beam;

a diagonal second tension rod having a hooked first end and a threaded second end, said hooked first end of said second tension rod extending through and being hooked to said hooking surface of said second structural angle bracket at a point that is adjacent said middle portion of said front beam, said threaded second end of said second tension rod extending through and being fastened to said second end of said interior structural cross support, said second tension rod being positioned to prevent the outward warping of said front beam.

9. A method for preventing the outward warping of a front beam of a push back storage rack system, the storage rack system having at least two front vertical uprights, an interior structural cross support having a first end and a second end, and a front beam having a middle portion and extending between the at least two front vertical uprights, the method comprising:

mounting a first tension rod having a first end and a second end on the storage rack system by connecting the first end of the first tension rod to the middle portion of the front beam and connecting the second end of the first tension rod to the first end of the interior structural cross support;

mounting a second tension rod having a first end and a second end on the storage rack system by connecting the first end of the second tension rod to the middle portion of the front basin and connecting the second end of the second tension rod to the second end of the interior structural cross support;

using the first and second tension rods to transfer impact forces that originate from within the rack system and that are exerted against the middle portion of the front beam by connectively exerting the tension forces against the first and second ends of the interior structural cross support, thereby bracing the front beam with the interior structural cross support and preventing outward warping of the front beam.

10. A method for preventing the outward warping of a front beam of a push back storage rack system, the storage rack system having at least two front vertical uprights, an interior structural cross support having a first end and a second end, a front beam having a middle portion and extending between the at least two front vertical uprights, and at least one structural angle bracket having a vertically planar attachment surface and a horizontally planar hooking surface, the vertically planar attachment surface of the at least one structural angle bracket extending partially along the length of the front beam, the method comprising:

mounting a first tension rod having a first end and a second and an the storage rack system by connecting the first end of the first tension rod to the horizontally planar hooking surface of the at least one structural angle bracket proximate the middle portion of the front beam and connecting the second end of the first tension rod to the first end of the interior structural cross support;

mounting a second tension rod having a first end and a second end on the storage rack system by attaching the first end of the second tension tad to the horizontally planar hooking surface of the at leant one structural angle bracket proximate the middle portion of the front beam and attaching the second end of the second tension rod to the second end of the interior structural cross support;

using the first and second tension rods to transfer impact forces exerted against the middle portion of the front beam by connectively exerting tension forces against the first and second ends of the interior structural cross support, thereby bracing the front beam with the interior structural cross support and preventing outward warping of the front beam.

11. A method for preventing the outward warping of a front beam of a push back storage rack system, the storage rack system having at least two front vertical uprights, at least two interior vertical uprights, a front beam having a middle portion and extending between at least two front vertical uprights, and an interior structural cross support having a first end and a second end, the first and second ends of the interior structural cross support each being attached to the interior vertical uprights, the method comprising:

mounting a first tension rod having a first end and a second end on the storage rack system by connecting the first end of the first tension rod to the middle portion of the front beam and connecting the second end of the first tension rod to the first end of the interior structural cross support proximate one of the interior vertical uprights;

mounting a second tension rod having a first end and a second end on the storage rack system by connecting the first end of the second tendon rod to the middle portion of the front beam and connecting the second end of the second tension rod to the second end of the interior structural cross support proximate one of the interior vertical uprights;

using the first and second tension rods to transfer impact forces that originate from within the rack system and that are exerted against the middle portion of the front beam by connectively exerting the tension forces through the first and second ends of the interior structural cross supports to the interior vertical uprights, thereby bracing the front beam with the interior vertical uprights and preventing outward warping of the front beam.

12. A method for preventing the outward warping of a front beam of a push back storage rack system, the storage rack system having at least two front vertical uprights, at least two interior vertical uprights, a front beam having a middle portion and extending between the at least two front vertical uprights, at least one structural angle bracket having a vertically planar attachment surface and a horizontally planar hooking surface, the vertically planar attachment surface of the at least one structural angle bracket extending partially along the length of the front beam, and an interior structural cross support having a first end and a second end, the first and second ends of the interior structural cross support each being attached to the interior vertical uprights, the method comprising:

mounting a first tension rod baying a first end and a second end on the storage rack system by attaching the first end of the first tension rod to the horizontally planar hooking surface of the at least one structural angle bracket proximate the middle portion of the front beam and attaching the second cud of the first tension rod to the first end of the interior structural cross support proximate one of the interior vertical uprights;

mounting a second tension rod having a first end and a second end on the storage rack system by connecting the first end of the second tension rod to the horizontally planar hooking surface of the at least one structural angle bracket proximate the middle portion of the front beam and connecting the second end of the second tension rod to the second end of the interior structural cross support proximate one of the interior vertical uprights;

using the first and second tension rods to transfer impact farces exerted against the middle portion of the front beam by connectively exerting tension forces through the first and second ends of the interior structural cross supports to the interior vertical uprights, thereby bracing the front beam with the interior vertical uprights and preventing outward warping of the front beam.

\* \* \* \* \*